United States Patent [19]
Gustafson

[11] Patent Number: 5,659,731
[45] Date of Patent: Aug. 19, 1997

[54] METHOD FOR RATING A MATCH FOR A GIVEN ENTITY FOUND IN A LIST OF ENTITIES

[75] Inventor: Eric S. Gustafson, Macungie, Pa.

[73] Assignee: Dun & Bradstreet, Inc., Mary Hill, N.J.

[21] Appl. No.: 491,743

[22] Filed: Jun. 19, 1995

[51] Int. Cl.⁶ .............................. G06F 17/30; G06F 7/06
[52] U.S. Cl. ...................... 395/604; 395/238; 395/54
[58] Field of Search ........................... 395/600, 604, 395/238, 54; 364/253.1

[56] References Cited

U.S. PATENT DOCUMENTS

| | | | |
|---|---|---|---|
| 4,901,229 | 2/1990 | Tashiro et al. | 395/11 |
| 5,251,131 | 10/1993 | Massand et al. | 395/759 |
| 5,259,066 | 11/1993 | Schmidt . | |
| 5,262,941 | 11/1993 | Saladin et al. | 395/238 |
| 5,305,434 | 4/1994 | Ballard et al. | 395/357 |
| 5,396,624 | 3/1995 | Campbell, Jr. | 395/244 |

*Primary Examiner*—Thomas G. Black
*Assistant Examiner*—Greta L. Robinson
*Attorney, Agent, or Firm*—Leydig, Voit & Mayer, Ltd.

[57] ABSTRACT

In a system that accepts a given search entity from a user and utilizes a database to identify a possible matching entity from a large list of entries, a method is provided for evaluating the reliability of the matching entity. Preferably, the method is carried out with minimal human intervention. A user inputs a plurality of attributes to identify a given entity, the system identifies a possible matching entity, and assigns a numerical grade to reflect the match quality of each attribute. Thereafter, the method assigns a grade to each attribute score, assembles the grades into a key, uses the key to address a memory, and retrieves a confidence code or quality indicator from the memory. The confidence codes are based on empirical information and reflect the overall quality of the match for the particular entity.

15 Claims, 6 Drawing Sheets

| Database Entry | Given Entry | Given Entry after Normalization | Score |
|---|---|---|---|
| ABC MFG Co | ABC Manufacturing | ABC MFG | 99.5 |
| ABC Widget MFG | ABC MFG Company | ABC MFG Co | 73.0 |
| ABC Widget MFG | XYZ Manufacturing | XYZ MFG | 34.0 |
| ABC Widget MFG | — — | — — | — — |

FIG. 3

|    | NAME   | ST # | STREET NAME | CITY   | STATE | P.O. BOX |
|----|--------|------|-------------|--------|-------|----------|
| 1  | A      | Ignore | A | F or Z | A | Ignore |
| 2  | A      | Ignore | B | F or Z | A | Ignore |
| 3  | A      | Ignore | F | F or Z | A | Ignore |
| 4  | A      | Ignore | Z | F or Z | A | Ignore |
| 5  | B      | Ignore | A | F or Z | A | Ignore |
| 6  | B      | Ignore | B | F or Z | A | Ignore |
| 7  | B      | Ignore | F | F or Z | A | Ignore |
| 8  | B      | Ignore | Z | F or Z | A | Ignore |
| 9  | F or Z | Ignore | A | F or Z | A | Ignore |
| 10 | F or Z | Ignore | B | F or Z | A | Ignore |
| 11 | F or Z | Ignore | F | F or Z | A | Ignore |
| 12 | F or Z | Ignore | Z | F or Z | A | Ignore |
| 13 | A      | Ignore | A | B | A | Ignore |
| 14 | A      | Ignore | B | B | A | Ignore |
| 15 | A      | Ignore | F | B | A | Ignore |
| 16 | A      | Ignore | Z | B | A | Ignore |
| 17 | B      | Ignore | A | B | A | Ignore |
| 18 | B      | Ignore | B | B | A | Ignore |
| 19 | B      | Ignore | F | B | A | Ignore |
| 20 | B      | Ignore | Z | B | A | Ignore |
| 21 | F or Z | Ignore | A | B | A | Ignore |
| 22 | F or Z | Ignore | B | B | A | Ignore |
| 23 | F or Z | Ignore | F | B | A | Ignore |
| 24 | F or Z | Ignore | Z | B | A | Ignore |
| 25 | A      | Ignore | A | A | A | Ignore |
| 26 | A      | Ignore | B | A | A | Ignore |
| 27 | A      | Ignore | F | A | A | Ignore |
| 28 | A      | Ignore | Z | A | A | Ignore |
| 29 | B      | Ignore | A | A | A | Ignore |
| 30 | B      | Ignore | B | A | A | Ignore |
| 31 | B      | Ignore | F | A | A | Ignore |
| 32 | B      | Ignore | Z | A | A | Ignore |
| 33 | F or Z | Ignore | A | A | A | Ignore |
| 34 | F or Z | Ignore | B | A | A | Ignore |
| 35 | F or Z | Ignore | F | A | A | Ignore |
| 36 | F or Z | Ignore | Z | A | A | Ignore |

FIG. 6

METHOD FOR RATING A MATCH FOR A GIVEN ENTITY FOUND IN A LIST OF ENTITIES

FIELD OF THE INVENTION

The present invention relates to database usage, and more particularly to a method configured to find a match for a given entity in a database containing information on a large number of entities.

BACKGROUND OF THE INVENTION

Systems of the foregoing type are well known. For instance, in the credit industry, credit history information on a given business entity being considered for credit is typically processed through a commercially available database, such as a Dun & Bradstreet database. A user may input the name of a business entity into a processor connected to the database, which then locates that given entity in the database and retrieves its credit history information. The credit history information is then used to make a decision on whether to grant or withhold credit for the given entity.

To simplify matters with a simple example, assume that the user has an interest in making a sale on credit to XYZ Corp., which is located at a particular address in a particular city. XYZ Corp. is the "given entity," or "given entry." After the user inputs this identifying information, the database is searched and an entry for XYZ Corp. located at a different address in the same city is identified from the database. A determination must then be made as to whether the identified XYZ Corp. is the same as the given entity XYZ Corp. If the determination is that they are the same, then the credit information from the database for the identified XYZ Corp. is used in making the credit decision for the transaction with the given entity.

Database systems such as these have far reaching applications beyond credit industry applications as illustrated above. In another illustration, a wholesale distribution entity may periodically distribute product information documents to retail entities. The costs associated with these documents may range from inexpensive product brochures (e.g., 50 cents each) to relatively costly product catalogs (e.g., $5.00 each). In order to save costs, since thousands of these product information documents may be distributed, the wholesale distribution entity may wish to direct the more expensive catalogs to those retailers having a high sales volume, and the less expensive brochures to retailers having a low volume of sales. In this application, the database system would be accessed to identify sales information on certain entities, as opposed to credit history information.

As will become apparent from the discussion that follows, the present invention is useful in broad-ranging applications, including both of the foregoing illustrations. In order to better explain the concepts and teachings on the present invention, however, the illustrations provided hereinafter will generally focus on the credit industry application presented above.

Business entities are typically listed in a database by what can be called attributes. The most common attributes are those which identify the entity, such as the business name and location. Location can be broken down into a number of attributes which include street number, street name, P.O. box number, city, town or the like, state (if in the U.S.) or country, and telephone number. These are common attributes which are found in many commercial databases reporting information on business entities. Other attributes are, however, sometimes utilized.

When it is desired to find a match for a given entity within such a list of business entities, inconsistencies in listing information can create matching problems. In some instances, inconsistencies can result from erroneous information stored in the database itself, and also from erroneous information input when identifying a given entity for whom a match is desired. In other instances, inconsistencies may result merely due to differing styles (e.g., abbreviations) used to identify certain attributes.

Credit departments typically have procedures for dialing up databases and obtaining credit information. Usually, the identification process is rather straightforward, and may be performed automatically. However, because of the different styles of stating names and addresses and the different care which is exercised by a large number of people in collecting information, the correlation between a given entity and the possible matching entities in the database do not always match precisely. When this occurs, human intervention is often necessary to make the intermediate determination as to which one of the one or more identified entities matches the given entity, before the ultimate determination of whether to grant or withhold credit can be made. Proper intermediate identification is particularly important in large dollar transactions. The human intervention usually involves either making an on-the-spot judgment as to the correct match, or making follow-up phone calls to investigate or verify the given entity.

Based on the amount of time required to verify the identity of a given entity, and the cost associated with the human (e.g., credit manager, clerk, etc.) who makes those decisions, it will be found that this somewhat mundane step in the credit approval procedure can consume a significant amount of dollar resources. Indeed, in situations where a large number of such credit decisions are made, it is found to be commercially feasible to isolate a subset of justifiable risks (i.e., those where a reliable match is made), and grant credit to those risks without the need for human intervention.

There are generally available processes and procedures, and commercially available software packages for determining a "best fit" match for any given entity within a large compilation or list of entities. For example, a system known as Soundex is well known and has long been used to find words that sound similar but are spelled differently. Similarly, a system known as AdMatch was used to help people find the proper 1970 census tract, using a base address.

In the credit industry, systems like the foregoing are used by credit reporting agencies to identify a list of possible matching entities and numerically score the match of the identifying attributes (name, address, city, etc.) for each entity identified. More particularly, automated matching systems are available, which parse, normalize, and further process a given entry to identify likely matches. These systems can also provide attribute-by-attribute information, such as a numerical score, reflecting the reliability of the match of each attribute. Thus, a user might be faced with an attempted match where the name matches exactly and thus has a 100% score, the street address has a 63% score, the town 79%, and the phone number a no entry condition. But, again, human intervention is usually required as a credit manager, clerk, or other appropriate person must examine the entries, the scores, and the overall context of the request in order to determine whether the information provided by the credit database indeed matches the characteristics of the given entity.

More sophisticated systems are known, wherein the individual attribute scores are weighted by factors based on empirical data to produce a composite score. These systems have been less than effective in the past, and it is typically found that programmers are continuously adjusting weighting factors to accommodate new conditions. As additional empirical data is collected, the weighting algorithm be further refined. Thus, it can be appreciated that the weighting function or algorithm is a ever-changing device. Unfortunately, while the newly adjusted weighting factors may accommodate a new condition successfully, they often unexpectedly and adversely affect other computations, and accurate matching problems persist.

It will be seen that a significant cost savings can be achieved by further automating and improving the credit approval process, thereby reducing or eliminating the need for a human to become personally involved.

SUMMARY OF THE INVENTION

In view of the foregoing, it is a general aim of the present invention to minimize the amount of human intervention required in selecting a given entity from a large list of entities.

Another object of the present invention is to further streamline the credit granting process by automatically providing a confidence indicator for the overall match between a given entity and a selected entity from the database.

In that regard, it is an object of the present invention to translate individual attribute matching scores into a composite score, and to generate confidence indicator therefor.

Overall, an objective of the invention is to preserve the limited resource and expense of human judgment in granting credit to those situations where judgment is required, and to identify possible transactions for automatic approval where the automatic matching system has a statistically high confidence level in the accuracy.

To achieve the foregoing and other objects, the present invention is generally directed to a method for utilizing and evaluating information, automatically and without human intervention, to select a given entity from within an extensive database containing a large number of entities. The present invention is intended to operate in conjunction with systems, wherein each entity stored in the database is identified by a plurality of attributes, such as name, address, telephone number, etc., and the system operates to match the attributes of a given entity with the attributes of entities stored within the database in order to indicate the identity of closely matching entities. In addition the system provides numerical scores for each attribute, indicating the quality or accuracy of the match for each of the attributes. The method of the present invention assigns a grade to each score of a plurality (n) of the attributes, with the grade being selected from a small number of possible grades, distinguishing between at least a clear match, a clear mismatch, and a possible match. Thereafter, the grades are assembled for the n attributes to produce a key for each particular entity, identified as a closely matching entity. The method then addresses a memory with each key to produce a match indicator, or confidence code, that reflects the overall quality of the match for the particular entity. The matching indicators stored within the memory are based on empirical information for the same or similar grade keys derived from tested matches for the same or similar key.

It is an important feature of the present invention to substantially reduce the need for human intervention and the exercise of human judgment. In one application, the present invention facilitates the automation of the credit granting/ denial process by automatically granting or denying credit, based upon the confidence code associated with a particular match. In this regard, a threshold confidence code is used to make the intermediate determination as to which one of a plurality of identified entities matches the given entity. The threshold value is preferably configured to vary depending upon the type and size of the requested transaction. In small dollar transactions, for example, the threshold confidence code is smaller than in large dollar transactions.

BRIEF DESCRIPTION OF THE DRAWINGS

The accompanying drawings incorporated in and forming a part of the specification, illustrate several aspects of the present invention, and together with the description serves to explain the principles of the invention. In the drawings:

FIG. 3 shows a table illustrating a match scoring example;

FIG. 6 is a table illustrating assumptions made in initially deriving and storing confidence codes and matching percentages in the preferred match embodiment of the present invention.

DETAILED DESCRIPTION OF THE PREFERRED EMBODIMENTS

As previously described, credit reporting agencies maintain computerized databases of business entities, which are stored and referenced by identifying attributes. The most common attributes describe the name, address, and telephone number of a particular entity. In the present invention, it is preferred to use the entity name, street number, street name, P.O. Box number, city and/or postal code, state (if in the United States) or country, and telephone number. Of course, other attributes can be included, such as state of incorporation, approximate number of employees, manufacturing or service organization codes using a generally accepted standard coding format, and the like.

When searching for a given entity in a database of stored entities, identification inconsistencies often arise. Although each attribute will normally have information entered, there are instances where no information will be assigned to a stored attribute. In other instances, the user may have only part of the necessary information, such as the corporate name and corporate postal address, but no information on telephone number. In yet other instances the telephone number entered may correspond to a particular direct dial, internal number of the given entity, rather than the general number of the entity, and therefore the telephone number attribute does not match. Another area where irregularities can occur is in street names, for example, the choice between "Road" or "Rd." in the street address. The degree of formality employed in recording the corporate name also causes problems (e.g., "Co." versus "Corp.").

Figure 1:
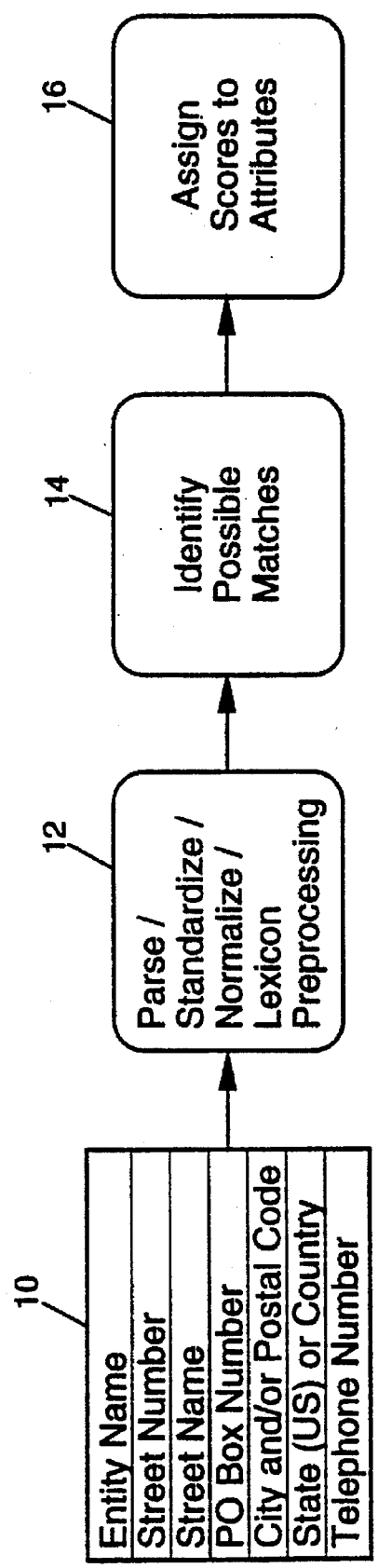
FIG. 1 is a flowchart showing the principal steps executed by a system searching a database for a given entry, and assigning match scores to each identifying attribute.

Having described the typical environment of the present invention, reference will now be made to the figures, wherein FIG. 1 is a flowchart illustrating the principal steps in achieving the broad concepts of the present invention. Namely, taking a plurality of attributes that describe a business entity, searching through a database of business entities, identifying one or more likely matching entities, and deriving a confidence indicator representing the probability of a proper match, for each identified entity.

The listing of preferred attributes are presented in the block denoted by reference numeral 10. It can be appreciated that additional attributes (as previously mentioned), fewer attributes, or different attributes may be used and yet maintain the highly effective matching ratio achieved by the present invention described herein. It may be determined, for example, that the matching scores obtained for the city, street name, and postal code attributes are sufficient to reliably identify a proper match, whereby the state or country code may be dropped. Likewise, it may be determined that, with an effective parsing and normalization routine, the entity name, street, and telephone numbers are enough attributes to provide accurate results. In another foreseeable embodiment, it may be desired to substitute an alternative attribute for a presently existing attribute, such as substituting a state of incorporation attribute for the state or country attribute. It is emphasized that the concepts of the present invention as described and claimed herein are not tied to any particular attributes, or any particular number of attributes, but apply to all of the foregoing and other similar scenarios.

Before the individual attributes of a given entry can be scored, so as to rate the quality or likelihood of a match between a particular attribute of the given entity with the corresponding attribute of an entity in the database, each attribute entered is preprocessed at step 12. Various techniques are known and have been used in the past for preprocessing attributes. The particular techniques are preferably carried out as a precursor to the method steps of the present invention, and therefore an exhaustive discussion of the various known techniques will not be discussed herein.

The preprocessing step typically begins by parsing the string of characters into words, which are sometimes referred to as "tokens." Thereafter, standardization and normalization routines are performed to reduce or eliminate inconsistencies among abbreviations. In the standardization process, each parsed word is reviewed and replaced with an industry standard equivalent, when appropriate "Street," for example, is standardized into a predetermined notation such as "St." "Connecticut" or "Con." are standardized to "CT." The Post Office was the driving force behind standardization terminology, particularly for addressing conventions.

The normalization process is very similar to the standardization process, except that it is concerned with converting non industry-standard words to some common form. For instance, the word "manufacturing" (and various forms thereof) is converted to "mfg." In addition, the normalization process may utilize phonetics, wherein it removes vowels and certain letter groups such as "ing." During the standardization and normalization process, "Noise" words such as "a" and "and" are eliminated, and miscellaneous punctuation is handled, either by stripping all punctuation or maintaining it in a consistent fashion. Moreover, the normalization routine may convert all letters to upper or lower case.

In some embodiments, the preprocessing step 12 can also utilize a lexicon to further assist the standardization and normalization of the attributes. It is preferred that the same routines used in preprocessing the attributes of the given entry are also utilized during the initial input and storage of all entries maintained on the database. Utilizing consistent preprocessing routines thus facilitates the generation of a more precise measure of matches, even in the case where the data is input with the variety of styles and abbreviations, which can be expected when identifying the name or location of a particular entity.

The next broad step is to search the database to develop a list of possible or likely matching entries (step 14). There are a tremendous number of ways to deal with the issue of searching a large listing of entries to locate a match for a given entry. To this end, a "Matchkey" search may be utilized to accomplish this step. Matchkey searches are well known, and generally operate by combining several letters from a plurality of attributes to produce a single matchkey. This matchkey is then compared to like matchkeys formed from the database entries. To illustrate this point, the matchkey for the present invention may be formed by aggregating the first five letters from the entity name, the first four letters from the street name, and the first three digits from the postal code. This aggregation would be formed from the given entity, as well as each database entity for comparison. All database entries having a matchkey that corresponds to the matchkey of the given entity would be identified as possible matches.

After the search step 14 is completed, the processor assigns a score or rating to each attribute. The score is a statistically generated number that reflects the quality of the match between a particular attribute from the given entity and an identified entity. The higher the number, the closer the match, with a 100 representing a precise match. Preferably, each attribute of the given entry is successively compared against each attribute of all identified entries to generate a score for each attribute of the particular entity. A variety of algorithms are known that can make this statistical comparison.

Systems are known that achieve some form of entity identification and attribute scoring as illustrated in the foregoing description, and the present invention is not limited to any particular method or approach in realizing that result. Indeed, the method of the present invention is concerned with processing the attribute scores to formulate a confidence indicator that reflects the overall quality of the match between a given entity and an entity identified from a large listing of entities. To illustrate the broad concepts of the present invention, reference is now made to FIG. 2.

Reference numeral 20 identifies a table listing the attributes preferably used to identify an entity. Directly across from each attribute is a numerical score that has been assigned to each attribute, reflecting the match quality for that particular attribute. As previously mentioned, the numerical score is a number between 0 and 100 that represents an accuracy percentage associated with the match, with 100 percent being a perfect match. If no attribute entry is present, either in the database listing or in the given entry input by a user, a null value is inserted in the score column. It will be appreciated that, in the preferred embodiment, a zero score value, representing a very poor or a non-match situation, is quite different than a null value. While in the practice of the present invention a numerical value of zero could be used to represent a non-entry situation, and a numerical value of one could represent a no-match situation, it is significant that some distinction is made between a null value (no entry) situation, and a zero value (non-match) situation. A zero value (non-match) situation will serve to significantly reduce the likelihood of a match and thus reduce the value of the confidence indicator. In contrast, a null value merely indicates that no information was input (or stored), and thus may not significantly reduce the value of the confidence indicator.

To better illustrate the scoring profile, reference is briefly made to FIG. 3, which is a table that presents four specific examples of entity name attribute scoring. The table includes four columns. The first column lists the entity name as stored in the database, which has previously been standardized and normalized. The second column lists the entity name, as input by a user, and the third column lists this input name after it has been standardized and normalized. Thus, the score listed in the fourth column reflects the match comparison between the first and third column entries.

In the first example, the entity name "ABC Manufacturing" was entered by the user, normalized to "ABC MFG," and compared against "ABC MFG CO." Based on statistical data, the processor would determine that the names are likely one and the same, and therefore assign the attribute an extremely high matching score (99.5 percent in the illustrated embodiment). The second example (after standardization and normalization) compares "ABC MFG CO" against "ABC Widget MFG." Although both names share "ABC" and "MFG," the given entity does not have "Widget" in the title. Again based on statistical information, the omission may be simply a result of user error in entry. Accordingly, the processor assigns a matching score of 73.0 percent, reflecting a lesser likelihood that the entries are one and the same. In the third example, the names "XYZ MFG" and "ABC Widget MFG" are compared, and assigned a very low 34.0 percent matching score, since "MFG" is the only common word.

Finally, the last example illustrates a no entry situation. In this situation, the user did not enter any entity name information. Based on other information (e.g. address and/or telephone number) entered by the user, the processor identified a possible matching database entry having the name "ABC Widget MFG." Nevertheless, since there is no attribute to compare the name to, the null value is carried across to the score column. In the invention's presently preferred embodiment, the score would be the same (i.e., null) if the user had entered name information but the identified database entry had no name information. That is, when either the given entity attribute or the stored entity attribute is a no-entry, the null value will be carried across to the score column. However, in an alternative embodiment, it may be desired to identify and distinguish a null condition for an attribute of an entry stored in the database, from a null condition for an attribute of a given entry.

Returning now to FIG. 2, the individual attribute scores are graded at step 22. Here, the relatively high resolution of the matching score is segmented into a limited grade set. Preferably, the limited grade set includes the possible grades of a clear match ("A"), a possible match ("B"), a clear mismatch ("F"), and a no-entry condition ("Z"). Utilizing the preferred match scoring approach, a match score of 90–100 percent receives a match grade of "A." A match score of 50–89 percent receives a match grade of "B," and a match grade of "F" is assigned to match scores below 50 percent. A match grade of "Z" is assigned to a null score, or a no-entry condition.

It may be desired to revise this grading step 22 to reflect additional gradations. For example, it may be desired to provide greater result resolution by assigning "A" to match scores of 92–100 percent, "B" to match scores of 70–91 percent, "C" to match scores of 40–69 percent, and "D" to match scores below 40 percent. These match scores are chosen solely for the purpose of illustration. If one or more match grades were added to the presently preferred four (A, B, F, and Z), the match score ranges would necessarily be determined by empirical and statistical data. All embodiments, however, maintain a match grade to account for a no-entry condition. Likewise, it may be desired to eliminate the no-entry grade of "Z", whereby only grades of "A", "B", and "F" would be utilized After assigning a match grade to each attribute at step 22, the match grades are assembled into a key at 24. This key 24 is used to address a look-up table 26, to retrieve an overall match confidence indicator. In the preferred embodiment seven individual attributes are used, and each is assigned one of four match grades. Accordingly, there are 16,384 ($4^7$) possible key 24 combinations. Thus, the look-up table 26 must have 16,384 address locations.

Figure 4:
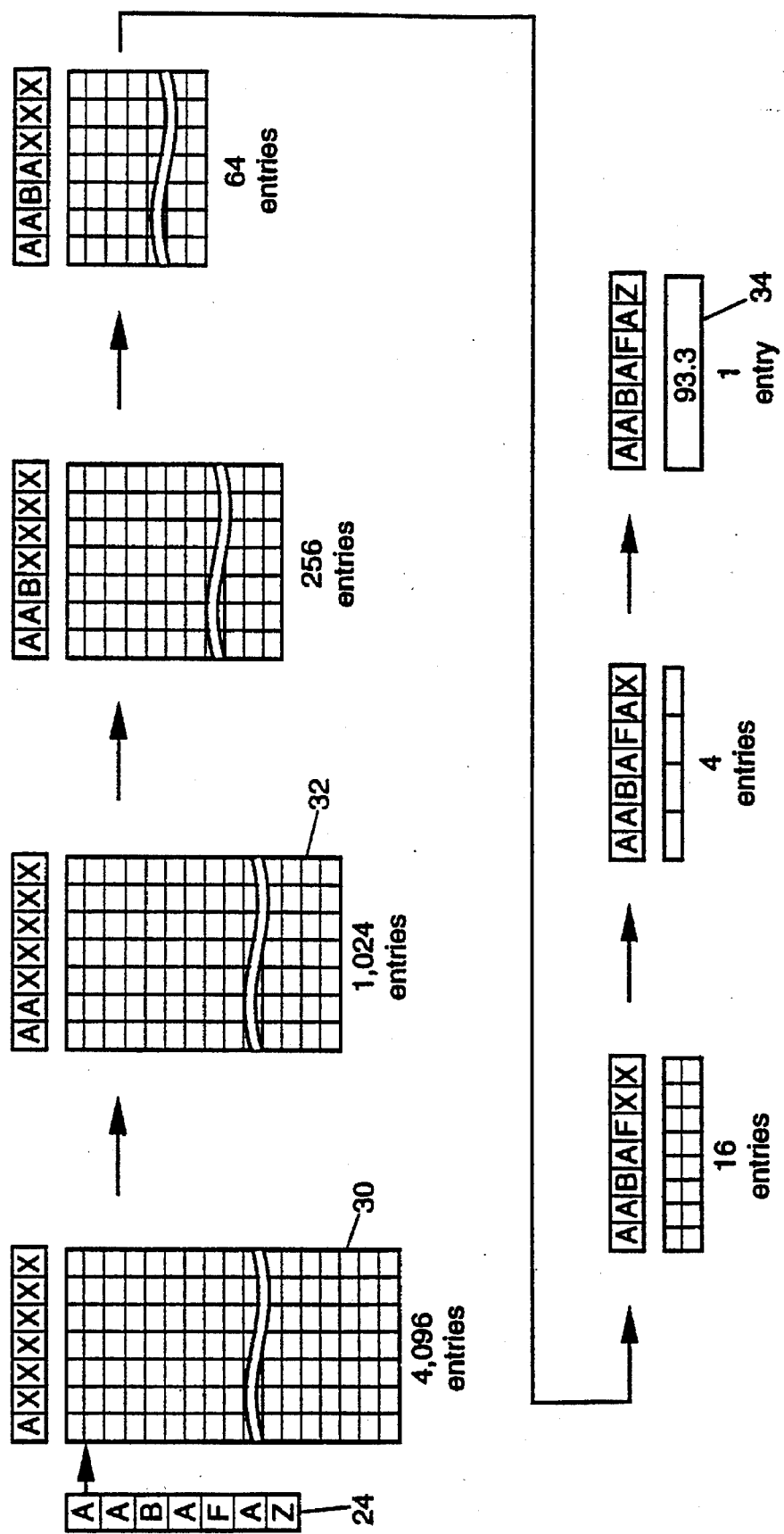
FIG. 4 is a diagram conceptually illustrating the match grade key memory addressing of the preferred embodiment of the present invention.

Continuing with the example match grades and key 24 presented in FIG. 2, reference will be made to FIG. 4, which conceptually illustrates how the key 24 is addressed to the look-up table 26. It can be appreciated that, since there are four possible grades for each attribute, one quarter of the table address space maps to entity names having a match grade of "A." Thus, considering the first attribute grade of the key, the look-up table address space is effectively reduced to 4,096 entries at 30. Similarly, 1,096 table entries (reference numeral 32) correspond to a match key 24 having a match grade of "A" for both the entity name and street number attributes. Continuing through the match key 24, FIG. 4 illustrates how the look-up table size effectively decreases by successive multiples of four, as additional match key 24 attribute grades are considered. Ultimately, only one table location 34 remains and corresponds to the particular match key. Thus, one specific table address corresponds to each possible match key. In the figure, the values of 8 and 93.3 are illustrated as being stored in this address location. As illustrated, the grade key of "AABAFAZ" has a confidence code of 8 and a 93.3 percent likelihood that the identified entry is the same as the given entry input by the user.

FIG. 4 is provided merely for conceptional illustration, and it will be understood that mapping a particular key to a specific table location is a rather simple task, which may be handled mathematically with very little processing power and very little processor time. For example, each of the four match grades may be assigned a numerical value of zero through three. Assume that zero is assigned to "A," one to "B," two to "F," and three to "Z." The match key of "AABAFAZ" may be treated as the base four number 0010203, which is equal to 275 in base 10. This numerical value, then, may be used to address the memory look-up table 26.

There are a variety of ways, in addition to the foregoing, in which the match grade key may be mapped to a look-up table address. Indeed, the match grade letters discussed herein are largely for purposes of illustration, and in an alternative embodiment the matching scores may be mapped directly to a numerical grade, for example zero to three. Accordingly, in practice the grade key may be a seven digit string of numbers, instead of letters. The significant aspect is that a numerical value, whether directly or indirectly obtained, may be readily utilized to directly address a memory which stores the look-up table entries. In addition, the seven attribute grades may be combined in some way to form a key having fewer than seven digits.

Figure 2:
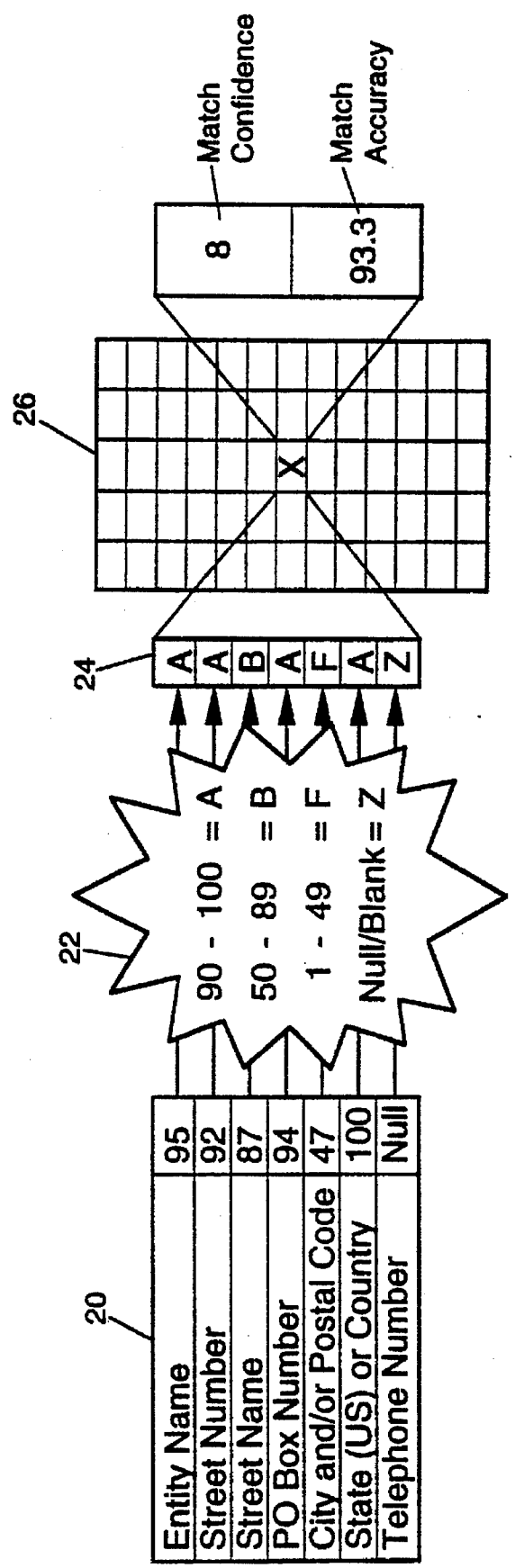
FIG. 2 is a flow diagram illustrating the primary method steps of the preferred embodiment of the present invention.

Continuing with the description of FIG. 2, the look-up table 26 is an aggregate of memory locations, wherein each location contains two numerical values that represent a quality of the match between the given entity and an identified entity: a confidence code and an accuracy percentage. The confidence code is a number ranging from 1 to 10, with 1 representing a low confidence in the match quality and a 10 representing a high match quality. The accuracy percentage is a numerical value preferably expressed as a percentage, so that a value of 100, or 100 percent, reflects a perfect match. These numerical values are derived in part from empirical data, and in part from a statistical formulation.

With a preferred table size of 16,384 entries, it will be appreciated that the initial calculation of these numbers may be a tremendous undertaking. That is, to generate 16,384 numbers to initially fill the table, wherein each number is based upon a statistically sufficient sampling of test cases, would require an enormous amount of time. Accordingly, it is preferred to use some means of simplifying the process. Based upon experience, it was found with the present invention that certain assumptions could be made, without appreciably distorting the derived confidence codes and match percentages. For example, it was found that the match grade for the state code must be an "A" for a match to occur. It was also found that the phone number was of very limited utility. Indeed, this component was primarily used only in tie-breaking situations, for example, where one or more entities were identified as possible matching entities with substantially equal matching scores.

Another assumption that was made to simplify the process was to ignore street number and P.O. Box numbercomponents. Because entities often have multiple buildings, or multiple departments within a single building these components often fail to match even thought he entity is a proper match. The primary assumption, however, was to assume a state component match grade of "A." It was found that the state component always matched properly identified entities. FIG. 6 is a table illustrating the various assumptions that were made in simplifying the table size for computing the initial confidence codes and match percentages. As shown in the figure, match grades of "F" and "Z" were often grouped. Ultimately based on the assumptions, the 16,384 entry table was simplified down to 36 families of possible component match combinations.

After simplifying the table to the 36 families shown in FIG. 6, over 4,500 test entities were assessed with a match grade, and then manually verified. The confidence code and match percentage values, then, derived from the number of correct and incorrect manual verifications, from the over 4,500 entity sampling. The values corresponding to a particular family were written into the appropriate locations within the table, so as to fill the entire 16,384 entries.

While the foregoing process was undertaken to generate an initial table of values, it will be appreciated that the maintenance of the table will be an ongoing process. As confidence codes and match percentages for a particular table entry, or group or entries, is found to be inaccurate, the value may be updated. In this regard, it may be desired to maintain empirical data to update table entries. Accordingly, it is understood that, over time, the resolution of the table will migrate from the initial resolution of 36 families of values, to a much finer and even more accurate resolution of values. It should also be understood that the foregoing process was undertaken solely to generate an initial set of confidence code and match percentage values, and should not be read as a limitation upon the method steps of the present invention.

It is contemplated that, by keeping records over time of the accurate and false identifications, data stored in the look-up table 26 may be revised to accuracy and resolution of the confidence codes stored therein. In this regard, it may be desired to divide a particular match set into several smaller match sets. Of course, as the resolution of the look-up table 26 is increased, the more tedious the record-keeping becomes.

It was previously mentioned that, in an alternative embodiment, it may be desired to further segment the match key by adding additional grades. For instance, additional grades C, D, and E may be added. Adding further grades substantially enlarges the size of the look-up table 26. Adding one additional grade C, for example, enlarges the table size from 16,384 ($4^7$) entries to 78,125 ($5^7$) entries. In yet a further embodiment, it may be desired to add, or reduce the number of attributes utilized to generate the match key. Adding an additional attribute, for a total of eight attributes, would increase the look-up table size from 16,384 entries to 65,536 ($4^8$) entries. Likewise, deleting an attribute, for a total of six, would decrease the look-up table size to 4,096 ($4^6$) entries.

The tradeoff, therefore, is that the look-up table 26 is increased in size as match grades or attributes are added. Certainly, with the memory devices and processors that are presently available, those elements do not restrict some growth of the table size, over the preferred 16,384 entry size. However, there is a substantial cost in determining the empirical data that is initially entered into the table, and with the maintenance of that data as further empirical information is obtained. On the one hand, increasing the table size may be desired to further increase the accuracy or resolution of the results. On the other hand, the user is ultimately interested only in whether or not the given entry and identified entry are a likely match, and the cost associated with expanding the table size becomes prohibitive.

It was previously described that certain systems are known that use formulaic approaches, whereby a mathematical equation is derived for transforming the match scores into a single numerical value. Under this approach, empirical data is used to derive weighting factors that form part of the equation. When new conditions arise, or new empirical data gathered, that affects a change in the equation, the equation is then often fails to deal as effectively with previous conditions.

The particular approach of the present invention of utilizing a look-up table 26, which has discrete locations and definite values for certain match grade keys and thus match scores, offers significant advantages over such formulaic or equation driven approaches. Continuing the earlier illustration, wherein the match key "AABAFAZ" mapped to the memory location of the look-up table containing the confidence code of 8 and accuracy percentage value of 93.3 percent: suppose that as additional empirical data is collected it is determined that match keys of "AABAFAZ" are in fact accurate 95.6 percent of the time. Then, the numerical value in that single table location may be changed, without affecting the results obtained from any other match key. In this way, the values of the look-up table 26 may be updated as further empirical data is gathered. It can be appreciated that the formulaic approach does not lend itself to such ready adjustments.

The ultimate decision to grant or deny credit for a given transaction may ultimately be based upon a combination of factors including the dollar amount sought and the match accuracy percentage. Higher dollar transactions, demand a higher accuracy percentage. In this regard it may be desired to supplement the accuracy percentage value with a simple numerical value ranging, for example, from one to ten, to serve as a confidence indicator. A value of one would correspond to low percentage values of the value obtained from the look-up table, and thus represent a low confidence level in the match, whereas a value of ten would correspond to high percentage values of the value from the look-up table and represent a high confidence level.

Figure 5:
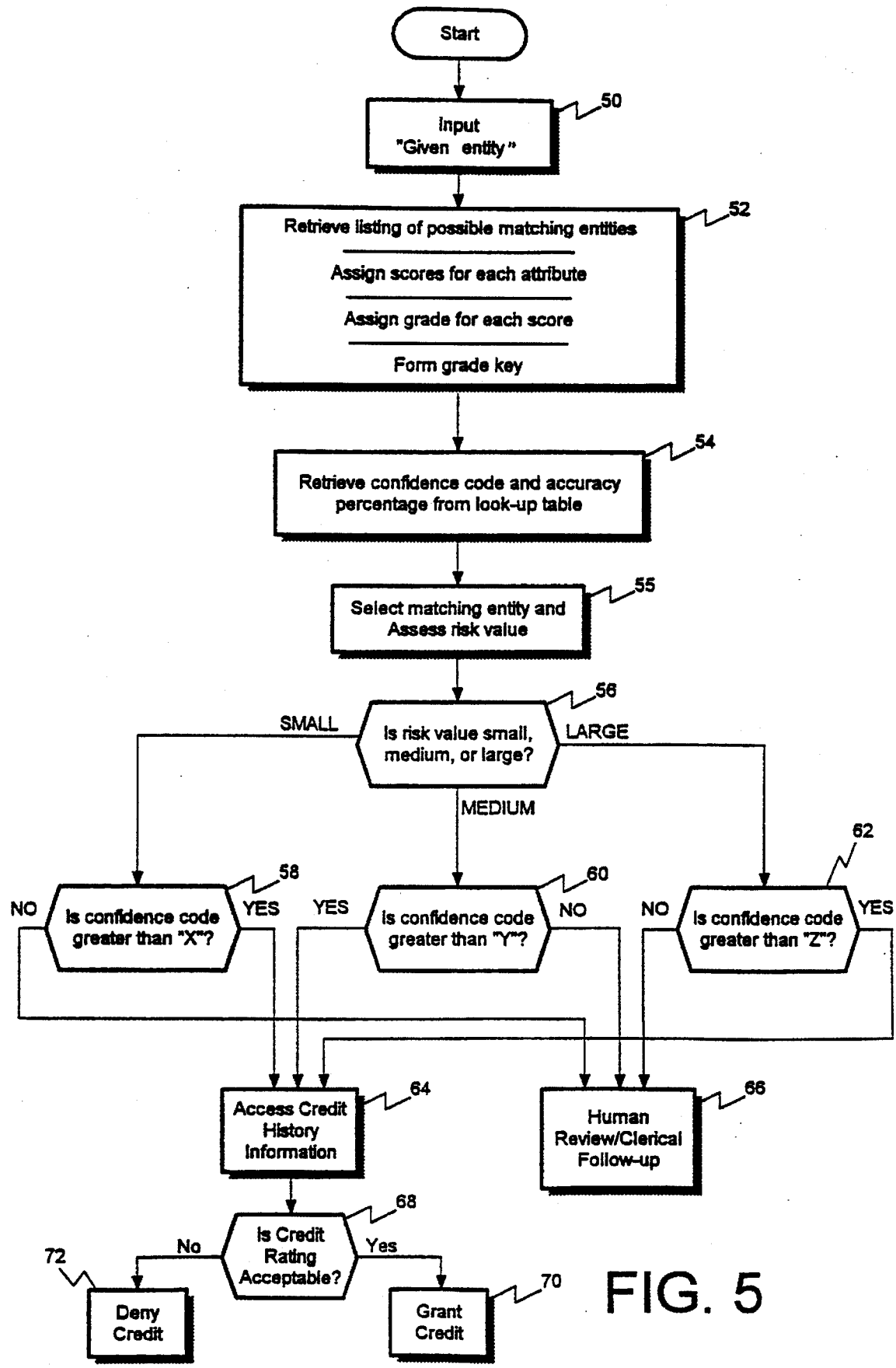
FIG. 5 is a flowchart illustrating the logic flow of the present invention in a credit granting/denying application.

It is contemplated that the system utilizing the present invention will utilize the confidence indicator in providing automation. For example, for low dollar transactions a lower confidence level may be utilized to automatically grant the credit request. In higher dollar transactions the threshold value of the confidence indicator is increased. To better illustrate this point, reference is made to FIG. 5, which is a flowchart showing the logic flow for the present invention, when employed in a credit granting/denying application.

The process begins at step 50, with a user inputting the appropriate attributes for a given entity, for which credit is desired. The system then searches a database of business entities to retrieve a listing of possible (or likely) matching entities, assigns a numerical score to each attribute, assigns a grade to each attribute score, and forms a grade key (step 52). Utilizing the grade key, a memory look-up table is addressed to retrieve both a confidence code and an accuracy percentage (step 54). As mentioned above, the present invention then utilizes the confidence code, in connection with the dollar value of the credit transaction sought and the retrieved credit history information, to determine whether to grant or deny the credit request.

More specifically, step 54 is executed for each identified entity. The entity as having the highest accuracy percentage and confidence code is then "selected" as the matching entity, and the system then assesses a "risk value" (i.e., small, medium, or large) to that entity (step 55); the "risk value" being based in part on the amount of credit sought. Based upon the risk value, a threshold value for the confidence code is used to determine whether to access and retrieve credit history information (step 64) or proceed with human review or clerical follow-up (step 66).

In very small dollar transactions, the cost of the credit data is not justified, and the whole match issue and subsequent retrieval of credit information may be avoided. In small dollar transactions, the cost associated with the review of match candidates is often a relevant cost component of the overall cost of the credit information, and therefore preferably reduced (for example, by automating the process). As the dollar amount grows, the justification for the expense of accessing credit history information increases. However, as the confidence level of a particular match decreases, the expense justification likewise decreases. Accordingly, the risk value and the confidence code are both factors in determining whether to access and retrieve credit history information.

If the risk value is small, for example, then the threshold value for the confidence must be greater than a predetermined value X, in order to retrieve credit history information (steps 58 and 64). If the risk value is medium, then the threshold value for the confidence code must be greater than a predetermined value Y, in order to retrieve credit history information (steps 60 and 64). Finally, if the risk value is high, then the threshold value for the confidence code must be greater than a predetermined value Z, in order to retrieve credit history information (steps 62 and 64). Otherwise, the human intervention or clerical follow-up is required (step 66). In the foregoing illustration, the predetermined value X is less than Y, which is less than Z.

In those instances where credit history information is accessed (step 64), the system evaluates the credit rating, obtained from the retrieved information, in connection with the amount of credit desired (step 68) to determine whether to grant credit (step 70) or deny credit (step 72).

The above-example is provided to illustrate just one way that the confidence code and/or accuracy percentage may be used in automating a particular transaction. It is understood that similar uses of the confidence code may be employed in systems having other applications as well(i.e., non-credit industry applications).

Another significant advantage of the preferred system resides in the accommodation of no-entry conditions. When a user is searching for a given entity with a relatively common name, such as "ABC Tire Co", "Your Tire Store", "ABC Locksmith", or "Just Tires," many entities will likely be identified as possible matching entities, and therefore it will be necessary to more fully enter identifying information so that a good match may be achieved. Experienced users, however, may recognize that when the entity name is rather unique, accurate results may be obtained even when merely entering the entity name. Relatedly, users may sometimes enter less that all attributes for certain types of transactions. For example, in a credit checking situation, when the dollar amount sought is relatively small, users may input less that all the attributes. In large dollar transactions, however, it will be desired to enter all the attributes to better ensure a higher confidence indicator.

As previously mentioned, it may be desired to use additional and/or alternative attributes to identify entities. Similarly, in an alternative form of the present invention, geographical population density data may be utilized in generating the confidence code or accuracy percentage. For example, if the city identified in a location attribute corresponds to a city having a high population density (e.g., New York, N.Y.), the resulting accuracy percentage and confidence code may be smaller than it would be for a lesser populated city (e.g., Charleston, S.C.), assuming all other attributes and scores remain the same. That is, the confidence code for "ABC Tire Store" in New York City will likely be lower than the accuracy percentage and confidence code for "ABC Tire Store" in Charleston.

It will be appreciated that the concepts and teachings of the present invention as described above apply equally to systems that invoke a direct on-line connection with the database, as well as systems that submit batch jobs to the database. That is, a user seeking to verify a small number of entities may dial-up and connect to a database, establishing a direct, on-line connection. Thereafter, entity attributes may be input and searched against the database in real-time. Alternatively, particularly when a large number of entities are to be searched, the processing may be submitted to the database as a batch job. In this regard, a user may append a file containing hundreds, or even thousands, of entity attributes to an overnight batch request, for example. The database would then, one by one, parse the entity attributes, identify possible matching entities, look-up the confidence codes and match accuracy percentages, select the appropriate match, and append the appropriate information and data.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for utilizing and evaluating information, automatically and without human intervention, derived from a matching system, the matching system being of the type which searches an extensive database containing information on a plurality of entities, each entity being identified by a plurality of attributes, and the system being of the type which matches the attributes of an given entity with the attributes of entities stored within the database to indicate the identity of closely matching entities along with numerical scores for each attribute indicating the quality of the match for each of the attributes, the method comprising the steps of:

assigning a grade to the score of a plurality n of the attributes, with the grade being selected from a small number of possible grades distinguishing between at least a clear match, a clear mismatch, and a possible match condition;

assembling the grades for each of the n attributes to produce a key for a particular closely matching entity; and addressing a memory with the key to retrieve a match indicator that reflects the overall quality of the match for the particular entity, the memory containing matching indicators based on empirical information for the same or similar grade keys.

2. The method according to claim 1, wherein the matching indicators stored in the memory are also based on statistical formulations.

3. The method according to claim 1, wherein the grade key is an n digit key.

4. The method according to claim 1, wherein each attribute grade is based upon the numerical score associated with that attribute.

5. The method according to claim 1, wherein the small number of possible grades further includes a grade for a no-entry condition.

6. The method according to claim 5, wherein a no-entry grade is assigned to a no-entry condition in an attribute of the given entity.

7. The method according to claim 5, wherein a no-entry grade is assigned to a no-entry condition in an attribute of an entry stored in the database.

8. The method according to claim 1, wherein the small number of possible grades further includes a first no-entry grade assigned to a no-entry condition in an attribute of the given entity and a second no-entry grade assigned to a no-entry condition in an attribute of an entry stored in the database.

9. In a computerized system for storing information on a large group of business entities and automatically selecting a member of the group as a likely match with an given entity, the system including a database for storing a compilation of the large group of entities which are identified by a plurality of attributes, and a processor for accepting information specifying the attributes of a given entity and searching the compilation to identify possible matches with the listed entities, the processor being programmed to score the quality of a possible match for a plurality n of the attributes of each identified entity, a method for automatically, and without human intervention, determining the quality of the match produced by the processor and comprising the steps of:

assigning a grade to the score of each of the n attributes, the grade being selected from a limited grade set including distinctive grades for a match, a mismatch, a possible match, and a no-entry condition;

composing a key from the grades for the respective attributes;

addressing a table with the key; and extracting information from the table at an address specified by the key, the information reflecting the reliability of the match based on stored information statistically obtained from similar keys for other matches.

10. In a computerized system for storing information on a large group of business entities and selecting a member of the group as a likely match with an given entity, the system including a database for storing a compilation of the entities which are specified by information on a plurality of attributes, and a processor for accepting information specifying attributes of a given entity and searching the compilation to identify possible matches with the stored entities, the processor being programmed to score the quality of a possible match for each attribute of an identified entity, a method for automatically and without human intervention determining the quality of the match produced by the processor comprising the steps of:

selecting a number n of the attributes which will be used to grade the reliability of the match;

assigning a grade to the score associated with each of the n attributes, the grades being selected to at least include distinct grades for a match, a mismatch, a possible match and a no-entry condition;

assembling a key from the grades assigned to the n attributes;

providing a memory table addressable by all possible keys, the table having match reliability data stored therein; and addressing the table to obtain the match reliability data specified by the key.

11. The method according to claim 10, further including the step of analyzing the obtained reliability data to provide a confidence level for the key.

12. A method of processing commercial transactions comprising the steps of:

accessing a commercial database including a list of a large number of business entities with associated business data, the business entities being identified by a plurality of attributes;

automatically searching within that database to identify entities that possibly match a given entity specified by a plurality of attributes;

obtaining numerical scores reflecting the quality of the match of each attribute;

transforming the numerical score for each attribute to a grade selected from a limited subset of grades, the subset of grades reflecting a likely match, no match, and possible match conditions;

using the grades for the possible match to form a key, for each identified entity;

utilizing the key to address a memory table to retrieve reliability information stored in the memory, the reliability information being derived from empirical information; and using the reliability information to select a matching entity from the list of identified entities.

13. The method according to claim 12, wherein the subset of grades further includes a grade reflecting a no-entry condition.

14. The method according to claim 12, further including the step of using the reliability information in connection with the business data associated with the selected entity to automatically reach a decision for processing the commercial transaction.

15. The method according to claim 14, wherein the commercial transaction is a credit granting/denying transaction and the associated business data is a credit rating.

* * * * *

UNITED STATES PATENT AND TRADEMARK OFFICE
CERTIFICATE OF CORRECTION

PATENT NO.   : 5,659,731
DATED        : August 19, 1997
INVENTOR(S)  : Eric S. Gustafson It is certified that error appears in the above-indentified patent and that said Letters Patent is hereby corrected as shown below:

Title page, item [73], Assignee:   should read-- "Murray Hill"

Signed and Sealed this

Twenty-first Day of October 1997

Attest:

BRUCE LEHMAN

Attesting Officer

Commissioner of Patents and Trademarks